US008665317B2

(12) United States Patent
Hamada et al.

(10) Patent No.: US 8,665,317 B2
(45) Date of Patent: Mar. 4, 2014

(54) IMAGING APPARATUS, IMAGING METHOD AND RECORDING MEDIUM

(75) Inventors: Akira Hamada, Sagamihara (JP); Tomoharu Yamaguchi, Kodaira (JP)

(73) Assignee: Casio Computer Co., Ltd., Tokyo (JP)

( * ) Notice: Subject to any disclaimer, the term of this patent is extended or adjusted under 35 U.S.C. 154(b) by 353 days.

(21) Appl. No.: 13/245,127

(22) Filed: Sep. 26, 2011

(65) Prior Publication Data

US 2012/0075413 A1 Mar. 29, 2012

(30) Foreign Application Priority Data

Sep. 27, 2010 (JP) ................................. 2010-214760

(51) Int. Cl.
*H04N 7/00* (2011.01)
*H04N 5/228* (2006.01)

(52) U.S. Cl.
USPC .......... 348/36; 348/222.1; 348/142; 348/169; 348/E13.008; 396/264; 396/286; 396/472

(58) Field of Classification Search
USPC ......... 348/36, 142, 222.1, E13.008; 396/264, 396/286, 472
See application file for complete search history.

(56) References Cited

U.S. PATENT DOCUMENTS

| 7,936,384 B2 | 5/2011 | Sawachi |
| 8,089,527 B2 | 1/2012 | Tomita |
| 2007/0274703 A1* | 11/2007 | Matsuda ........................ 396/264 |
| 2008/0079824 A1 | 4/2008 | Sawachi |
| 2008/0122943 A1* | 5/2008 | Itoh ............................ 348/222.1 |
| 2009/0079844 A1 | 3/2009 | Suzuki |
| 2009/0185056 A1 | 7/2009 | Okamoto et al. |

FOREIGN PATENT DOCUMENTS

| JP | 2002-033949 A | 1/2002 |
| JP | 2005-175684 A | 6/2005 |
| JP | 3750499 B2 | 12/2005 |
| JP | 2006-235060 A | 9/2006 |
| JP | 2006-311196 A | 11/2006 |
| JP | 2007-166187 A | 6/2007 |
| JP | 2007-324976 A | 12/2007 |
| JP | 2008-092008 A | 4/2008 |
| JP | 2008-136024 A | 6/2008 |
| JP | 2009-081543 A | 4/2009 |
| JP | 2009-171268 A | 7/2009 |
| JP | 4463792 B2 | 2/2010 |
| JP | 2010-068190 A | 3/2010 |
| JP | 2010-081535 A | 4/2010 |

OTHER PUBLICATIONS

Japanese Office Action dated Jan. 16, 2012 (and English translation thereof) in counterpart Japanese Application No. 2010-214760.

* cited by examiner

*Primary Examiner* — Jay Patel
*Assistant Examiner* — Frank Huang
(74) *Attorney, Agent, or Firm* — Holtz, Holtz, Goodman & Chick (57) ABSTRACT

A digital camera captures at least photographic subjects intended to be positioned on left and right ends of a group photograph (temporary imaging), and prompts a user to designate the photographic subjects (may move) intended to be positioned on the left and right ends. Next, the digital camera, which has been placed on a suitable surface (such as on a desk), moves the optical zoom further to the wide-angle side than during the temporary imaging, and performs actual imaging when the self-timer reaches time up. Then, the digital camera identifies the photographic subjects designated by the temporary imaging within the actually captured image, and after determining the left, right, upper, and lower ends of a clipping area such that the identified photographic subjects are included, clips an image of the determined clipping area as a final image.

10 Claims, 6 Drawing Sheets

CLIPPING OF LEFT AND RIGHT ENDS

FIG. 4B

CLIPPING OF UPPER AND LOWER ENDS

IMAGING APPARATUS, IMAGING METHOD AND RECORDING MEDIUM

CROSS-REFERENCE TO RELATED APPLICATION

This application is based upon and claims the benefit of priority from the prior Japanese Patent Application No. 2010-214760, filed Sep. 27, 2010, the entire contents of which is incorporated herein by reference.

BACKGROUND OF THE INVENTION

1. Field of the Invention

The present invention relates to an imaging apparatus capable of self-timer imaging, an imaging method and a recording medium.

2. Description of the Related Art

Conventional cameras with a self-timer are not very user-friendly. When the user does not have a tripod, the camera is required to be placed on the top surface of something, which makes it difficult for the user to set the viewing angle. For example, when the camera is placed on a low table, the photographer is required to set the viewing angle while peering into the camera in a crouched position. Also, when the camera is placed in a location where the back surface of the camera is blocked, such as against a wall or the shelf board of a book shelf, the photographer cannot go around behind the camera and so cannot operate it. Although this problem can be solved to a certain extent by a rotating-lens-type camera, other problems such as a mechanism-related cost problem occur.

In self-timer imaging, the viewing angle is set such that photographic subjects other than the photographer are included within the imaging field, and then the shutter button is depressed. Subsequently, the photographer runs to enter the imaging field as a photographic subject. At this time, if the position at which the photographer has entered is outside of the set viewing angle, the position of the overall photographic subject changes, and as a result the overall photographic subject does not fit within the set viewing angle.

Therefore, a technology to solve this problem has been proposed in, for example, Japanese Patent Application Laid-Open (Kokai) Publication No. 2008-092008. In this technology, when an photographic subject to be imaged by an imaging apparatus such as a digital camera does not fit within the imaging field, the photographic subject is detected (three-dimensionally), a warning is issued, and the viewing angle is automatically widened by zooming so that the photographic subject is unfailingly included within the imaging field.

However, all it does for unfailingly including a photographic subject within an imaging field is to automatically widen the viewing angle by zooming. Accordingly, this technology has a problem. For example, if the direction of the digital camera is shifted, a set viewing angle is shifted from the center of the imaging field, and as a result the photographic subject is shown on one side of the captured image rather than the center thereof. Also, if a photographic subject is forcibly included within an imaging field, the viewing angle is unnecessarily widened along with it. Therefore, an image with an intended set viewing angle cannot be acquired.

SUMMARY OF THE INVENTION

An object of the present invention is to provide an imaging apparatus, an imaging method and a recording medium storing a program therein by which the degree of freedom of a camera setting location during self-timer imaging is increased, and an image including an intended imaging area is easily captured.

In order to achieve the above-described object, in accordance with one aspect of the present invention, there is provided an imaging apparatus capable of imaging using a self-timer, comprising: an imaging section; an imaging area setting section which sets photographic subjects intended to be positioned on both ends of an imaging area; and an imaging control section which identifies the photographic subjects intended to be positioned on both ends of the imaging area which have been set by the imaging area setting section, and captures an image by controlling an image viewing angle of the imaging section so that the photographic subjects are included within the imaging area, when imaging using the self-timer is performed.

In accordance with another aspect of the present invention, there is provided an imaging apparatus capable of imaging using a self-timer, comprising: an imaging section; a recognition section which recognizes photographic subjects on both ends from among a plurality of photographic subjects within an imaging area of the imaging section; and an imaging control section which captures an image by controlling an image viewing angle of the imaging section so that the photographic subjects on both ends which have been recognized by the recognition section are included within the imaging area, when imaging using the self-timer is performed.

In accordance with another aspect of the present invention, there is provided an imaging method using a self-timer in an imaging apparatus including an imaging section, comprising: an imaging step of performing imaging by the imaging section; an imaging area setting step of setting photographic subjects intended to be positioned on both ends of an imaging area; and an imaging control step of identifying the photographic subjects intended to be positioned on both ends of the imaging area which have been set in the imaging area setting step, and capturing an image by controlling an image viewing angle for the imaging step so that the photographic subjects are included within the imaging area, when imaging using the self-timer is performed.

In accordance with another aspect of the present invention, there is provided an imaging method using a self-timer in an imaging apparatus including an imaging section, comprising: an imaging step of performing imaging by the imaging section; a recognition step of recognizing photographic subjects on both ends from among a plurality of photographic subjects within an imaging area of the imaging step; and an imaging control step of capturing an image by controlling an image viewing angle for the imaging step so that the photographic subjects on both ends which have been recognized in the recognition step are included within the imaging area of the imaging step, when imaging using the self-timer is performed.

In accordance with another aspect of the present invention, there is provided a non-transitory computer-readable storage medium having stored thereon a program that is executable by a computer in an imaging apparatus capable of imaging using a self-timer, the program being executable by the computer to perform functions comprising: imaging processing; imaging area setting processing for setting photographic subjects intended to be positioned on both ends of an imaging area; and an imaging control processing for identifying the photographic subjects intended to be positioned on both ends of the imaging area which have been set by the imaging area setting processing, and capturing an image by controlling an image viewing angle for the imaging processing so that the photographic subjects are included within the imaging area, when imaging using a self-timer is performed.

In accordance with another aspect of the present invention, there is provided a non-transitory computer-readable storage medium having stored thereon a program that is executable by a computer in an imaging apparatus capable of imaging using a self-timer, the program being executable by the computer to perform functions comprising: imaging processing; recognition processing for recognizing photographic subjects on both ends from among a plurality of photographic subjects within an imaging area of the imaging processing; and imaging control processing for capturing an image by controlling an image viewing angle for the imaging processing so that the photographic subjects on both ends which have been recognized by the recognition processing are included within the imaging area of the imaging processing, when imaging using a self-timer is performed.

According to the present invention, advantageous effects are achieved in that the degree of freedom of a camera setting location during self-timer imaging is increased, and an image including an intended imaging area can be easily captured.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The preferred embodiments of the present invention will hereinafter be described with reference to the drawings.

First Embodiment

Figure 1:
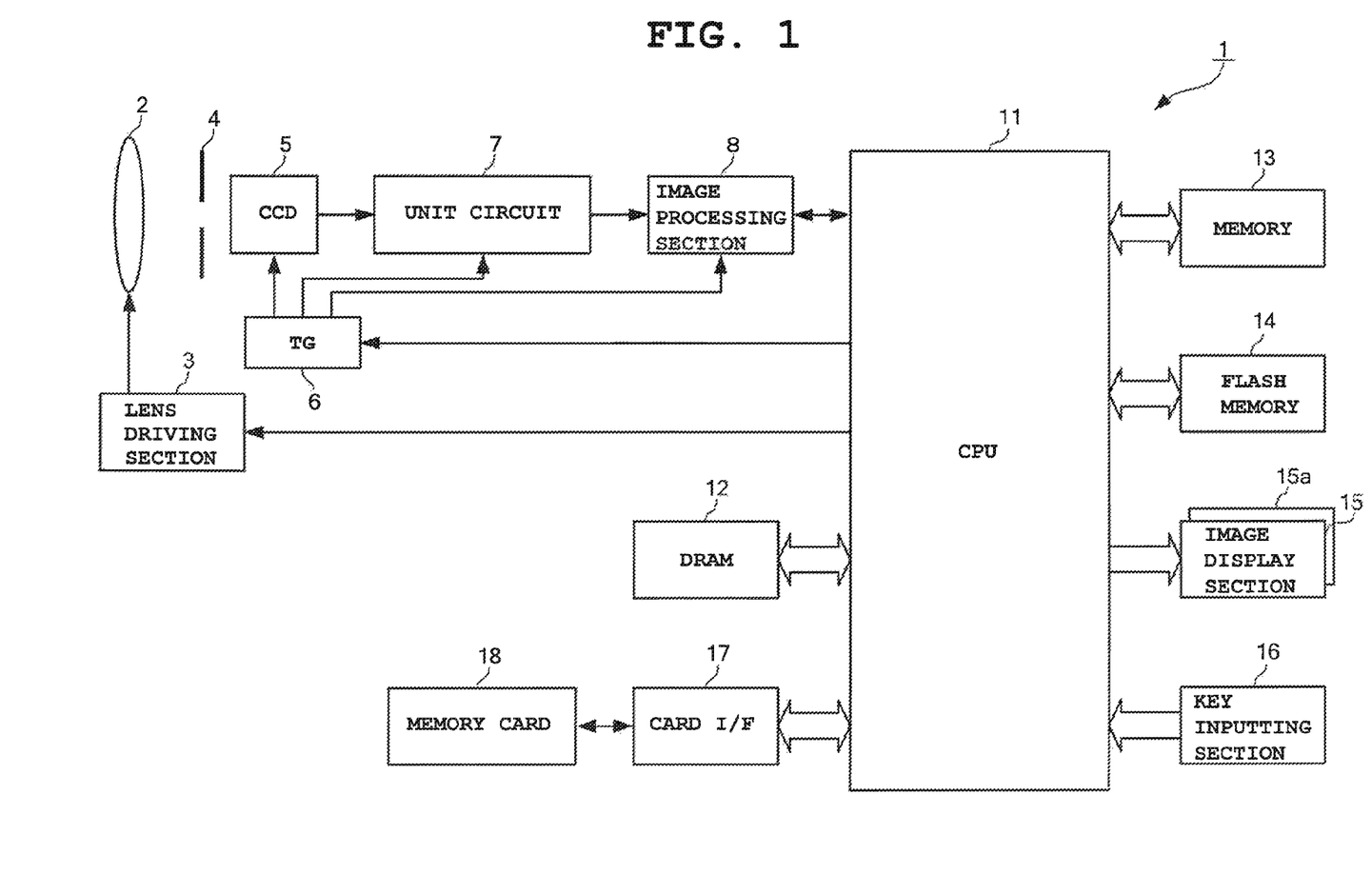
FIG. 1 is a block diagram showing the structure of a digital camera according to a first embodiment of the present invention.

FIG. 1 is a block diagram showing the structure of a digital camera according to a first embodiment of the present invention. In FIG. 1, a digital camera 1 includes an imaging lens 2, a lens driving section 3, a combined aperture/shutter 4, a charge-coupled device (CCD) 5, a timing generator (TG) 6, a unit circuit 7, an image processing section 8, a central processing unit (CPU) 11, a dynamic random access memory (DRAM) 12, a memory 13, a flash memory 14, an image display section 15, a key inputting section 16, a card interface (I/F) 17, and a memory card 18.

The imaging lens 2 includes a focus lens, a zoom lens, etc., and is connected with the lens driving section 3. The lens driving section 3 includes a focus motor and a zoom motor that respectively drive the focus lens and the zoom lens constituting the imaging lens 2 in an optical axis direction, and a focus motor driver and a zoom motor driver that drive the focus motor and the zoom motor in accordance with control signals from the CPU 11.

The combined aperture/shutter 4 includes a driver circuit not shown, and the driver circuit operates the combined aperture/shutter 4 in accordance with control signals sent from the CPU 11. This combined aperture/shutter 4 controls the amount of light irradiated from the imaging lens 2. The CCD (image sensor) 5 (imaging section), which is driven in accordance with timing signals of a predetermined frequency generated by the TG 6, converts the light of a subject projected through the imaging lens 2 and the combined aperture/shutter 4 to electrical signals, and outputs them to the unit circuit 7 as imaging signals.

The unit circuit 7, which is also driven in accordance with timing signals of a predetermined frequency generated by the TG 6, includes a correlated double sampling (CDS) circuit that performs correlated double sampling on imaging signals outputted from the CCD 5 and holds the sampled imaging signals, an automatic gain control (AGC) circuit that performs automatic gain control on the sampled imaging signals, and an analog-to-digital (A/D) converter that converts the analog automatic-gain-controlled imaging signals to digital signals. Imaging signals from the CCD 5 are sent to the image processing section 8 through this unit circuit 7, as digital signals.

The image processing section 8, which is also driven in accordance with timing signals of a predetermined frequency generated by the TG 6, performs image processing of image data sent from the unit circuit 7 (pixel interpolation processing, γ-correction, luminosity color difference signal generation, white balance processing, exposure correction processing, etc.), compression and expansion processing of image data (such as compression and extension in Joint Photographic Experts Group (JPEG) format, Motion-JPEG [M-JPEG] format, or Moving Picture Experts Group (MPEG) format), processing for combining a plurality of captured images, etc.

The CPU 11 (imaging area setting section, imaging control section, image processing section, recognition section, confirmation section) is a single-chip microcomputer that controls each section of the digital camera 1. In the self-timer imaging (referred to as tracking self-timer in the present invention) of the first embodiment, first, the user holds the digital camera 1 and performs temporary imaging of photographic subjects intended to be positioned on the left end and the right end of a group photograph, Next, the user sets the digital camera 1 on a desk or the like and performs actual imaging on the wide-angle side. When these operations are performed, the CPU 11 controls each section such that the photographic subjects, who have been set during the temporary imaging, in the actually captured image are recognized, and an image of the "imaging area" is clipped therefrom. Details of the tracking self-timer imaging will be described later.

The DRAM 12 is used as a buffer memory that temporarily stores image data sent to the CPU 11 after being captured by the CCD 5, and as a working memory of the CPU 11. The memory 13 stores a program necessary for the CPU 11 to control each section of the digital camera 1 and data necessary to control each section, and the CPU 11 performs processing based on this program. The flash memory 14 and the memory card 18 are recording media that store image data captured by the CCD 5 and the like.

The image display section 15 includes a color liquid crystal display (LCD) and a driver circuit thereof. In an imaging stand-by state, the image display section 15 displays a photographic subject captured by the CCD 5 as a through image. Also, the image display section 15 displays a recorded image that has been read out from the flash memory 14 or the memory card 18 and expanded when it is replayed. In addition, the image display section 15 includes a touch panel 15a on the top surface thereof. Although details will be described later, the touch panel 15a is used to designate photographic subjects on the left and right ends of an imaging area during imaging using the self-timer. The key inputting section 16 includes a plurality of operation keys, such as a shutter switch (SW), a zoom SW, a mode key, a SET key, and a cross-shaped key, and outputs operation signals based on key operations by the user to the CPU 11. The memory card 18 is detachably mounted on the card I/F 17 by a card slot (not shown) in the main body of the digital camera 1.

Next, operations of the above-described first embodiment will be described.

Figure 2:
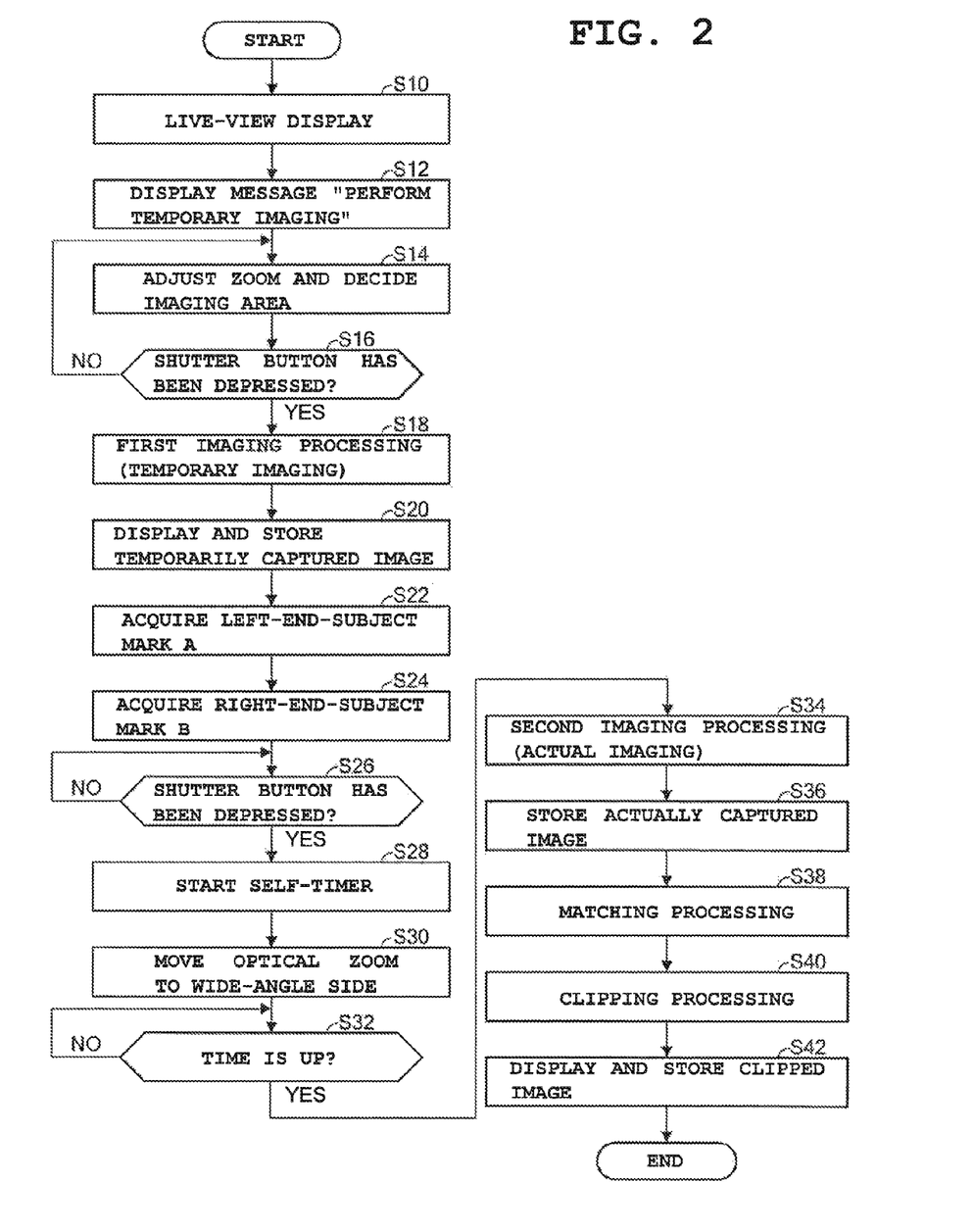
FIG. 2 is a flowchart for explaining operations of the digital camera according to the first embodiment.
Figure 3:
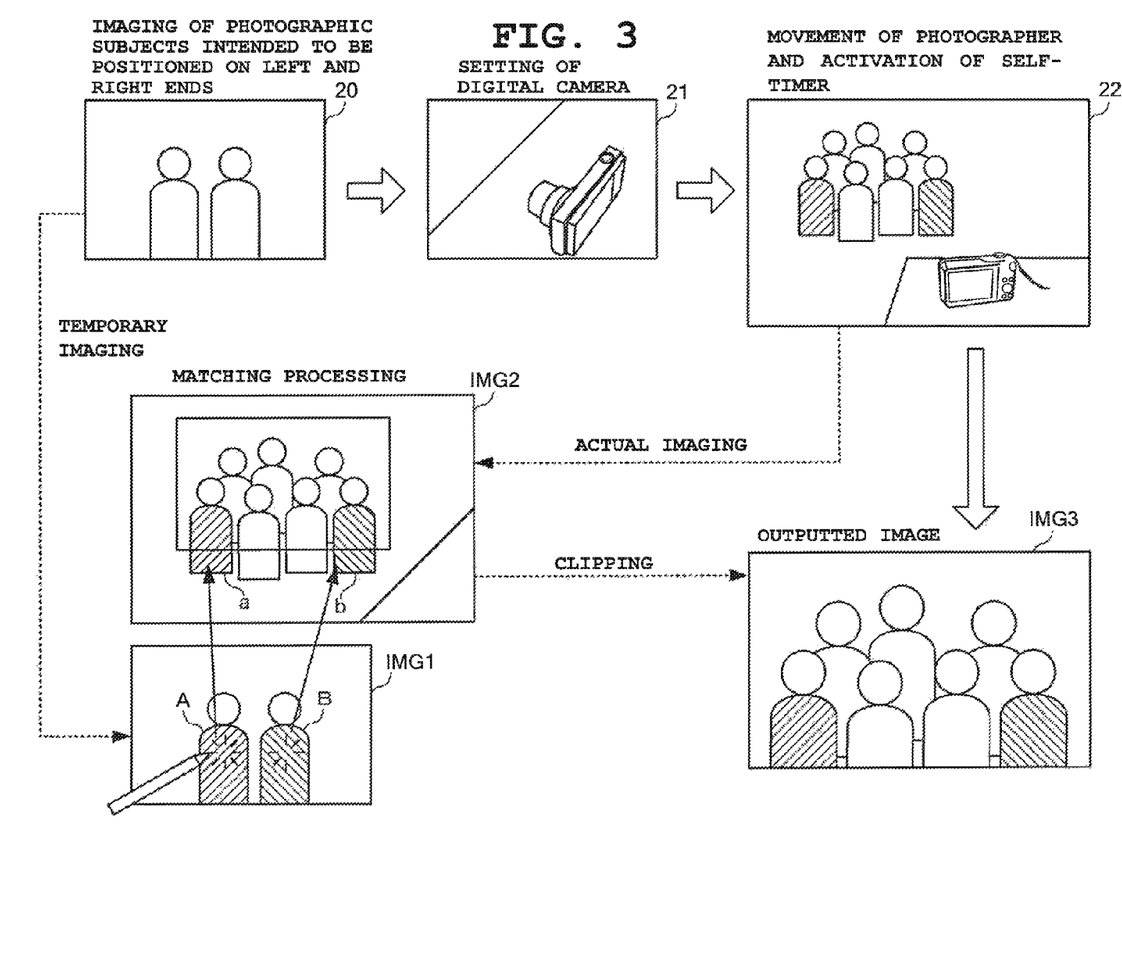
FIG. 3 is a conceptual diagram for explaining operations of the digital camera according to the first embodiment.

FIG. 2 is a flowchart for explaining operations of the digital camera 1 of the first embodiment, and FIG. 3 is a conceptual diagram for explaining operations of the digital camera of the first embodiment. When a photographer sets the digital camera 1 in "tracking self-timer mode", the digital camera 1 operates based on the following procedures. First, the CPU 11 changes the display of the image display section 15 to live-view display (Step S10) and displays the message "perform temporary imaging" (Step S12). In response, the photographer holds the digital camera 1, and decides an "imaging area" (the area currently being displayed in live view) such that at least photographic subjects intended to be positioned on the left and right ends of a group photograph are captured, by determining its direction and adjusting the zoom setting as in the case of ordinary imaging (Step S14). That is, the photographer decides an imaging area 20 such that at least photographic subjects intended to be positioned on the left and right ends of a group photograph are included within the viewing angle as shown in FIG. 3.

Next, the CPU 11 judges whether or not the photographer has depressed the shutter button (Step S16). When judged that the shutter button has not been depressed, the CPU 11 returns to Step S14 and continues processing for deciding an "imaging area". Conversely, when judged that the shutter button has been depressed, the CPU 11 performs a first imaging processing (temporary imaging) of the imaging area 20 as shown in FIG. 3 (Step S18). Then, The CPU 11 displays a temporarily captured image IMG1 on the image display section 15 and stores it in the DRAM 12 (Step S20).

Next, the CPU 11 displays the message "designate photographic subject intended to be on the left end" on the image display section 15, and acquires an area designated by the operator (or the photographer) using an input means such as the touch panel 15a, as a subject mark A (Step S22), Note that the operator may designate a certain area rather than a photographic subject. In addition, the CPU 11 may acquire a single coordinate designated by the operator and acquire an area adjacent to the coordinate as the subject mark A.

Then, in the same way, the CPU 11 displays the message "designate photographic subject intended to be on the right end" on the image display section 15, and acquires an area designated by the operator (or the photographer) using an input means such as the touch panel 15a, as a subject mark B (Step S24). In this case as well, the operator may designate a certain area rather than a photographic subject. In addition, the CPU 11 may acquire a single coordinate designated by the operator and acquire an area adjacent to the coordinate as the subject mark B.

In the above-described processing, only photographic subjects intended to be positioned on the left and right ends are captured during temporary imaging. However, there is no problem even if a person other than the photographic subjects intended to be positioned on the left and right ends are captured, since the photographic subjects intended to be positioned on the left and right ends are designated by the operator's (or the photographer's) operation.

Additionally, in the above-described processing, photographic subjects intended to be positioned on the left and right ends are captured by a single temporary-imaging operation. However, this is not limited thereto. Each photographic subject maybe captured separately by two temporary-imaging operations, and the photographic subject intended to be positioned on the left end and the photographic subject intended to be positioned on the right end may be separately designated from the respective images captured by these temporary-imaging operations. In the case where photographic subjects intended to be positioned on the left and right ends are captured by a single temporary-imaging operation, the photographer himself who is performing the temporary imaging cannot be designated as a photographic subject. However, in the case where a photographic subject intended to be positioned on the left end and a photographic subject intended to be positioned on the right end are designated respectively from images separately captured by two temporary-imaging operations, the photographer himself who is performing the temporary imaging can be designated as a photographic subject to be positioned on the left end or the right end if the photographer is changed between the first temporary imaging operation and the second imaging operation.

Next, the CPU 11 judges whether or not the shutter button has been depressed again by the photographer (Step S26). When judged that the shutter button has not been depressed, the CPU 11 waits until the shutter button is depressed. After designating the left-end-subject mark A and the right-end-subject mark B, the photographer sets the camera on a suitable surface (such as on a desk) such that the camera is pointed substantially at the photographic subjects as indicated by reference numeral 21 in FIG. 3, and depresses the shutter button again. Then, the photographer moves to the subject side and enters the imaging area. Reference numeral 22 in FIG. 3 shows the positional relationship between the digital camera 1 and the photographic subjects at this point. All that is required here is that the photographic subject intended to be positioned on the left end and the photographic subject intended to be positioned on the right end are respectively positioned on the left end and the right end as designated.

When judged that the shutter button has been depressed, the CPU 11 starts the countdown of the self-timer (Step S28) and moves the optical zoom further to the wide-angle side than that during the temporary imaging (Step S30). Next, the CPU 11 judges whether or not the self-timer has reached time up (Step S32). When judged that the self-timer has reached time up, the CPU 11 performs a second imaging processing (actual imaging) (Step S34), and stores an actually captured image IMG2 in the DRAM 12 (Step S36), as shown in "actual imaging" of FIG. 3. As a result of the optical zoom being moved to the wide-angle side before the second imaging processing, all the photographic subjects can be included within the viewing angle even if the position and the direction of the digital camera 1 are different from those during the temporary imaging.

Next, the CPU 11 performs matching processing between the temporarily captured image IMG1 and the actually captured image IMG2 (Step S38). Specifically, the CPU 11 detects areas in the actually captured image IMG2 which most closely match the subject mark A and the subject mark B in the temporarily captured image IMG1 which have been designated during the temporary imaging, as shown in "matching processing" in FIG. 3. The areas matching the subject mark A and the subject mark B are referred to as a corresponding area A and a corresponding area B, respectively.

The matching method includes the following methods. Of these methods, an appropriate method is used depending on the intended purpose and requirements.

(a) Template matching based on the level of difference or similarity between pixel arrays, a pixel value distribution, a gradient histogram, etc. In a case where the distance between the digital camera 1 and the photographic subject in temporary imaging and that in actual imaging can be assumed to be almost the same, retrieval on the scale dimension (the retrieval of corresponding areas according to the difference of the scales) becomes unnecessary if the difference of the zooming levels is absorbed by the image size being converted in accordance with the optical zoom setting value, and template matching is performed.

(b) A method in which, when the template is limited to a person's face, a facial frame is detected from the actually captured image IMG2, and associated with a facial frame that matches most by various facial recognition methods (the details of which will be described later).

(c) A method using scale invariant local feature quantity, such as scale-invariant feature transform (SIFT) or speed-up robust features (SURF).

Note that a configuration may be adopted in which, when the detection of the corresponding areas A and B fails, the CPU 11 judges that the "imaging area" is not included in the viewing angle of the actually captured image IMG2, and after setting the zoom to a further wider angle, performs the actual-imaging processing at Step S34 again.

Figure 4A:
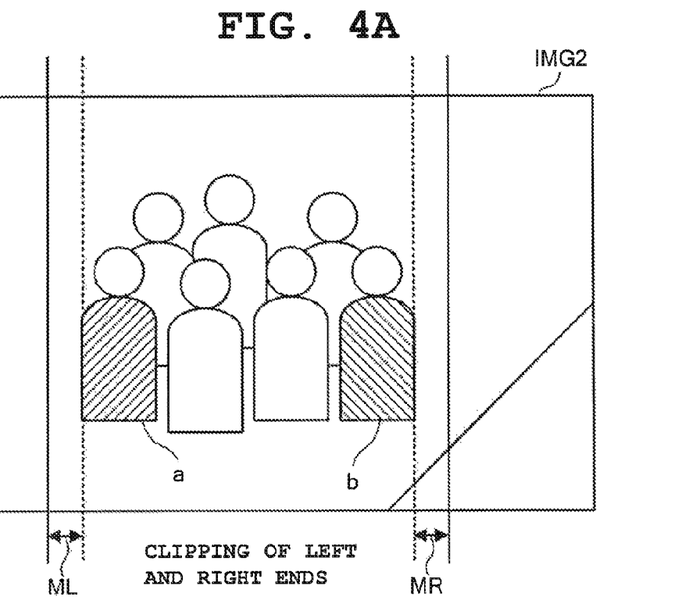
FIG. 4A and FIG. 4B are conceptual diagrams for explaining operations of the digital camera according to the first embodiment.
Figure 4B:
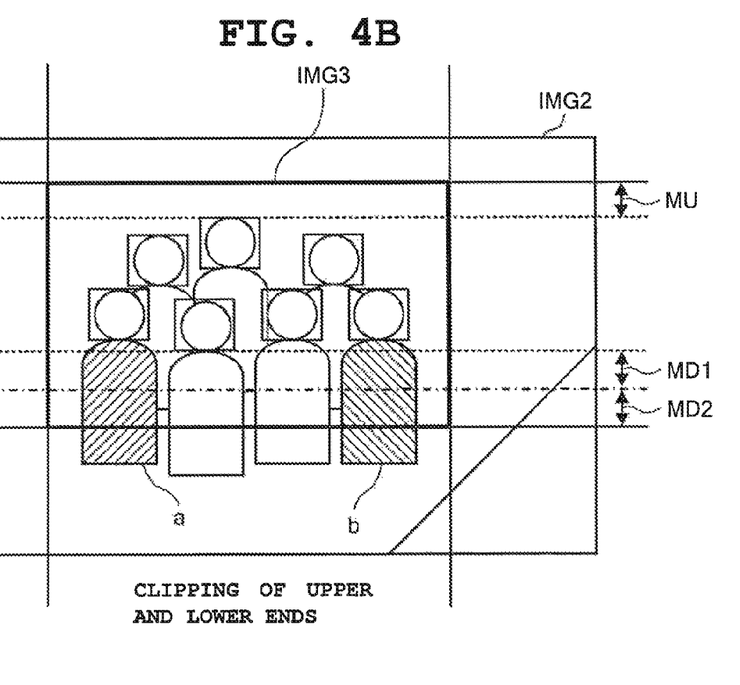

Next, the CPU 11 clips the actually captured image IMG2 in a rectangular shape based on the corresponding areas A and B (Step S40). FIG. 4A and FIG. 4B are conceptual diagrams showing an example of a method for clipping from the actually captured image IMG2. As shown in FIG. 4A, the left end of the clipping area corresponds to the left end of a predetermined margin ML (which may be a fixed value, or a value that is relatively determined, for example, in proportion to a corresponding area size) secured to the left of the corresponding area A, and the right end of the clipping area corresponds to the right end of a predetermined margin MR secured to the right of the corresponding area B.

The upper end and the lower end of the clipping area are clipped by an appropriate predetermined method. In the case of the group photograph, a method using the facial detection technology is used. Specifically, as shown in FIG. 4B, the upper end of the clipping area is set to correspond to the upper end of a predetermined margin MU secured on top of the uppermost facial frame among all the detected faces within the area between the left and right ends, and the lower end of the clipping area is temporarily set to correspond to the lower end of a predetermined margin MD1 secured below the bottommost facial frame.

Then, a desired up/down length for the clipping area is calculated from the distance between the left and right ends (left/right length) and a predetermined desired aspect ratio. When the distance between the upper end and the temporary lower end (temporary up/down length) is shorter than the desired up/down length, the temporary lower end is extended to compensate for the shortage MD2 (margin MD2) (on the assumption that a typical group photograph is taken, the lower end is extended rather than the upper end, so that a bust shot or a full-body shot is taken when the up/down length is much shorter than the desired up/down length), whereby the final position of the lower end is determined. As a result, the clipping area (image IMG3) shown in FIG. 4B is determined.

Here, additional imaging processing may be performed as optional processing. In the additional imaging processing, when the clipping area (image IMG3) is sufficiently within the inner edge of the actually captured image IMG2, the CPU 11 re-captures the image IMG2 by moving the optical zoom to the telescopic side depending on the imaging area. As a result, an image having more pixels=higher resolution than the image IMG2 can be acquired while including the "imaging area" within the viewing angle. In this instance, because geometric transformation (merely enlargement transformation) between the captured images is already known from the amount of zoom, an accurate image can be clipped by considering the geometrical transformation, without the matching processing being performed again (the matching processing may, of course, be performed).

Next, the CPU 11 displays the clipped image IMG3 on the image display section 15 and stores it in the flash memory 14 or the memory card 18 (Step S42). The temporarily captured image IMG1 and the actually captured image IMG2 are deleted as required after confirmation with the user.

As a result of this configuration, even when the digital camera 1 is being pointed substantially at the subject side, an image of an "imaging area" determined during temporary imaging, or in other words, an image in which all people to be captured are included, such as a group photograph, can be easily and unfailingly acquired.

Note that a configuration may be applied to the above-described first embodiment in which, when designating photographic subjects intended to be positioned on the left and right ends from people who are substantially facing forward after temporary imaging, the operator designates the facial frames of photographic subjects intended to be positioned on the left and right ends from among a plurality of facial frames detected by facial recognition being performed on an image acquired by the temporary imaging.

In addition, a configuration may be applied to the above-described first embodiment in which photographic subjects intended to be positioned on the upper end and the lower end are designated after temporary imaging. In this configuration, the upper and lower ends of a clipping area are clear. The upper end of a predetermined margin secured on a corresponding area of the upper end and the lower end of another predetermined margin secured under a corresponding area of the lower end can be set as the upper and lower ends of the clipping area, respectively. With regard to the determination of the left and right ends, the above-described method for determining the upper and lower ends can be applied to the left and right ends.

Second Embodiment

Next, a second embodiment of the present invention will be described.

In the second embodiment, the steps at which photographic subjects intended to be positioned on the left and right ends are designated are omitted. The CPU 11 performs facial recognition of all people shown in an actually captured image, and recognizes a facial frame on the left end as the subject mark A and a facial frame on the right end as the subject mark B, from among the plurality of detected facial frames. Then, the CPU 11 determines the left and right ends of a clipping area based on the subject marks A and B, and determines the upper and lower ends of the clipping area using a method similar to that of the above-described first embodiment, thereby determining the clipping area and acquiring a clipping image. In this instance, the matching processing is also unnecessary. Note that the structure of the digital camera 1 is the same as that in FIG. 1, and so explanation thereof is omitted.

Figure 5:
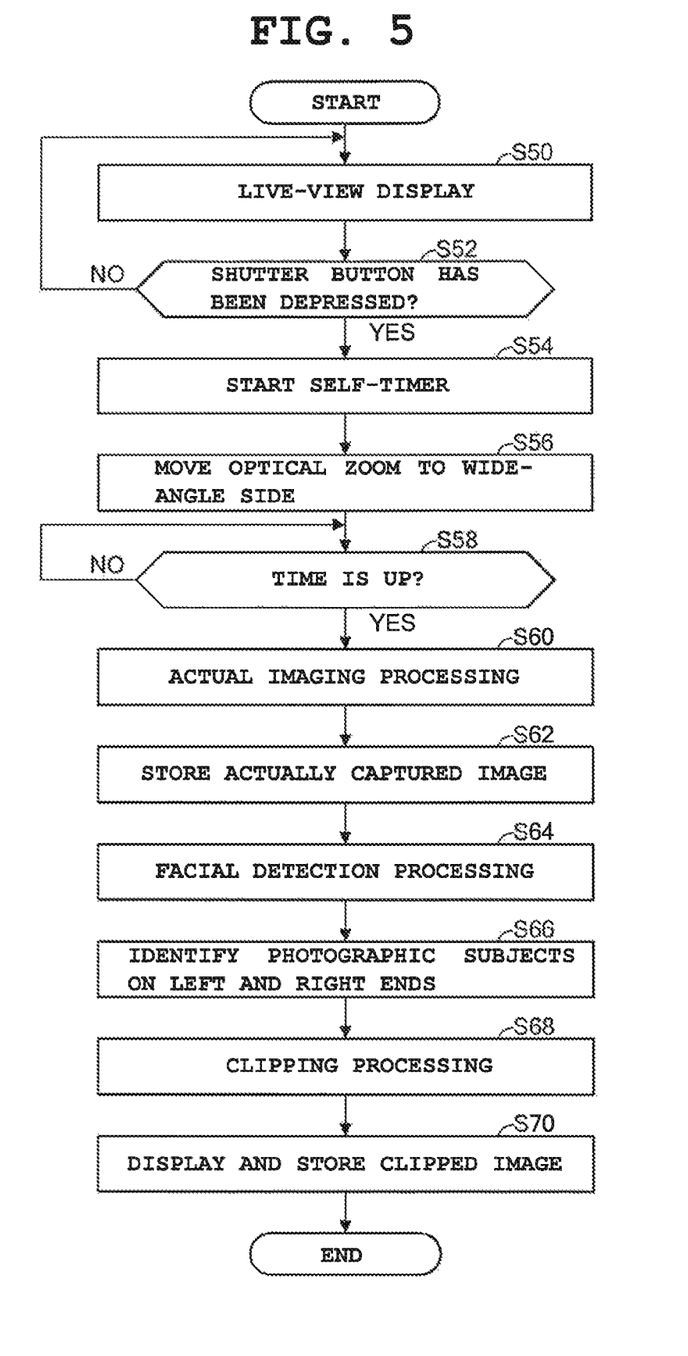
FIG. 5 is a flowchart for explaining operations of a digital camera according to a second embodiment.
Figure 6:
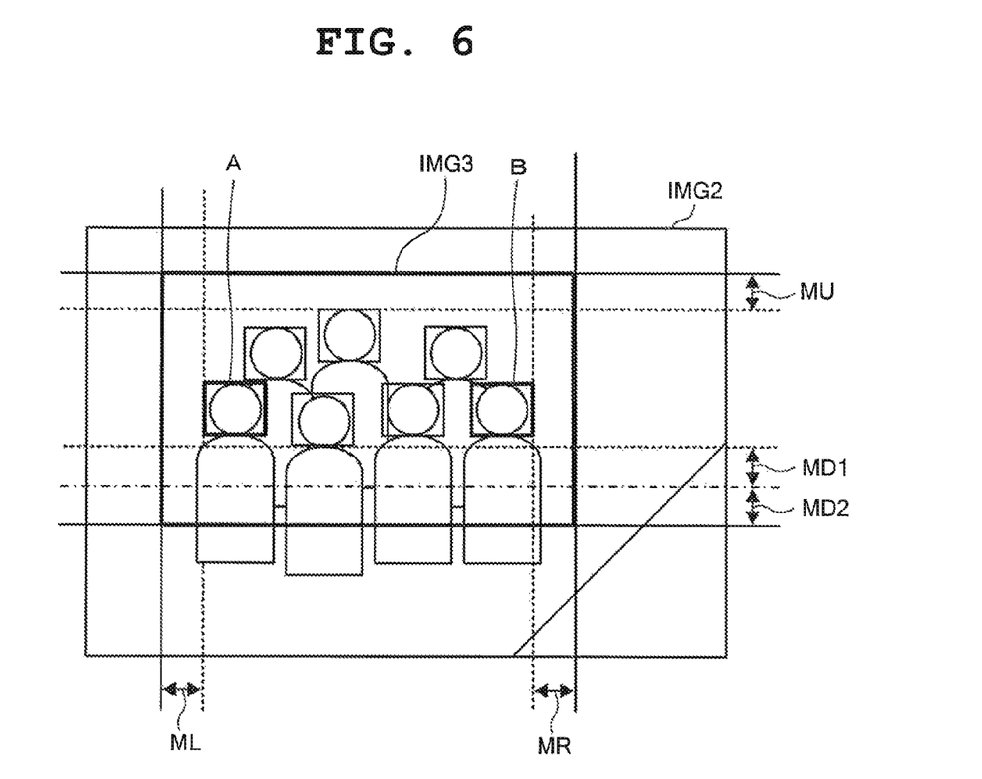
FIG. 6 is a conceptual diagram for explaining operations of the digital camera according to the second embodiment.

FIG. 5 is a flowchart for explaining operations of the digital camera 1 of the second embodiment, and FIG. 6 is a conceptual diagram for explaining an example of a method for clipping from the actually captured image IMG2. When a photographer sets the digital camera 1 in "tracking self-timer mode", the digital camera 1 operates based on the following procedures. First, the CPU 11 changes the display of the image display section 15 to live-view display (Step S50), and judges whether or not the photographer has depressed the shutter button (Step S52). When judged that the shutter button has not been depressed, the CPU 11 returns to Step S50 and continues live-view display.

Conversely, when judged that the shutter button has been depressed, the CPU 11 starts the countdown of the self-timer (Step S54) and moves the optical zoom to the wide-angle side (Step S56). Next, the CPU 11 judges whether or not the self-timer has reached time up (Step S58). The optical zoom may be moved to the maximum wide angle, or may be moved to a predetermined position on the wide-angle side which has been decided taking into consideration a zoom position most frequently used for group photographs. When judged that the self-timer has reached time up, the CPU 11 performs actual imaging (Step S60), and stores an actually captured image IMG2 in the DRAM 12 (Step S62). As a result of the optical zoom being moved to the wide-angle side before the actual imaging processing, all the photographic subjects can be included within the viewing angle even if the position and the direction of the digital camera 1 are different from the photographer's intended position and direction.

Next, the CPU 11 performs facial detection of all the people shown in the actually captured image (Step S64), and recognizes a facial frame on the left end as the subject mark A and a facial frame on the right end as the subject mark B from among the plurality of detected facial frames, thereby identifying photographic subjects on the left and right ends (Step S66), as shown in FIG. 6. Then, as in the case of the first embodiment, the CPU 11 determines the left and right ends of a clipping area based on the subject marks A and B, or in other words, the facial frames on the left and right ends, and determines the upper and lower ends of the clipping area based on facial frames on the upper and lower ends and a predetermined desired aspect ratio, thereby determining the clipping area and acquiring a clipping image IMG3 (Step S68), as shown in FIG. 6.

Note that optional processing may be performed here, as in the case of the above-described first embodiment. In the optional processing, when the clipping image IMG3 is sufficiently within the inner edge of the actually captured image IMG2, the CPU 11 re-captures the image IMG2 by moving the optical zoom to the telescopic side depending on the imaging area. As a result, an image having more pixels=higher resolution than the image IMG2 can be acquired while including the "imaging area" within the viewing angle.

Also note that a configuration may be adopted in which, when the detection of the subject marks A and B fails, the CPU 11 judges that the "imaging area" is not included in the viewing angle of the actually captured image IMG2, and after setting the zoom to a further wider angle, performs the actual-imaging processing at Step S60 again.

Next, the CPU 11 displays the clipped image IMG3 on the image display section 15, and stores it in the flash memory 14 or the memory card 18 (Step S70). The actually captured image IMG2 is deleted as required after confirmation with the user.

As a result of this configuration, even when the digital camera 1 is being pointed substantially at the subject side, an image in which all people to be captured are included, such as a group photograph, can be easily and unfailingly acquired.

In the above-described first embodiment, photographic subjects (people or objects) intended to be positioned on both ends of an imaging area are set, and imaging using a self-timer is performed by the image viewing angle being controlled so that the photographic subjects are included within the imaging area. Therefore, even when a photographer squeezes himself in between the photographic subjects so as to be one of the photographic subjects, and the photographic subjects move thereby, the photographic subjects can be automatically and unfailingly captured.

Also, by holding the digital camera 1 and setting an imaging area in advance, the photographer can easily automatically capture an image within the intended imaging area without a tripod, even if self-timer imaging is performed with the digital camera 1 being placed on a desk or the like, and the direction being shifted. That is, according to the above-described first embodiment, the viewing angle setting (imaging area setting) of the self-timer can be easily and intuitively performed, and the degree of freedom of a camera setting location can be increased. Additionally, even in locations where conventionally only a cut-and-try approach could be attempted, self-timer imaging can be successfully performed in a single attempt. Moreover, even when the photographer himself is not a photographic subject, since image capturing can be performed with the digital camera 1 being placed on a stable location such as a desk, camera shake can be prevented even without a tripod.

In addition, the present invention has a configuration in which set photographic subjects intended to be positioned on both ends of an imaging area are identified, and after imaging is performed by the image viewing angle being controlled so that the photographic subjects intended to be positioned on both ends of the imaging area are included within the imaging area, an image of the imaging area is acquired from the captured image such that photographic subjects on the upper and lower ends of the captured image are included. Therefore, an imaging area for imaging can be controlled to be an intended area that unfailingly includes photographic subjects intended to be positioned on the upper and lower ends in addition to photographic subjects intended to be positioned on both ends of the imaging area.

Moreover, the present invention has a configuration in which an actual image is captured with the optical zoom set further to the wide-angle side than during the setting of the imaging area, and an image of the imaging area is clipped from the actually captured image such that photographic subjects intended to be positioned on both ends of the imaging area and photographic subjects on the upper and lower ends of the actually captured image are included. Therefore, even when a photographer squeezes himself in between the photographic subjects so as to be one of the photographic subjects, and the photographic subjects move thereby, the photographic subjects can be automatically and unfailingly captured.

Furthermore, the present invention has a configuration in which, when photographic subjects intended to be positioned on both ends of an imaging area cannot be identified from an actual image, the actual image is re-captured by setting the optical zoom further to the wide-angle side, and then an image of the set imaging area is clipped from the re-captured actual image such that the photographic subjects intended to be positioned on both ends of the imaging area and photographic subjects on the upper and lower ends of the re-captured actual image are included. Therefore, even when photographic subjects significantly move while the self-timer is running, the photographer's intended imaging area can be unfailingly captured.

Still further, the present invention has a configuration in which, when an imaging area including photographic subjects intended to be positioned on both ends is narrower than the imaging area of an image captured by controlling the image viewing angle, the image is re-captured by setting the optical zoom lens to the telescopic-side to the extent that the photographic subjects are included in the imaging area. Therefore, a higher quality image can be acquired.

Yet still further, the present invention has a configuration in which photographic subjects intended to be positioned on both ends of an imaging area are set based on a user operation on a touch panel included in the display section. Therefore, imaging areas can be more specifically set.

Yet still further, the present invention has a configuration in which all photographic subjects within an imaging area are recognized, and photographic subjects intended to be positioned on both ends of the imaging area are selectively set from among the recognized photographic subjects. Therefore, photographic subjects intended to be positioned on both ends of an imaging area can be set using clearly recognizable photographic subjects that can be recognized by the imaging apparatus.

Yet still further, the present invention has a configuration in which confirmation is made regarding whether or not to store a captured image after imaging. Therefore, the unnecessary storage of failed captured images can be prevented.

Yet still further, the present invention has a configuration in which photographic subjects within an imaging area are recognized, and imaging using the self-timer is performed by the image viewing angle being controlled so that the recognized photographic subjects are included in the imaging area. Therefore, all intended photographic subjects such as people and objects can be automatically captured, without the imaging area being set by a user operation using zoom or the like.

Yet still further, in the above-described embodiments, the present invention has been applied to a digital camera as an imaging apparatus. However, the present invention may be applied to a mobile phone, a desk-top electronic calculator, a wristwatch, a personal computer (laptop computer), a personal digital assistant (PDA), a music player, and the like having an imaging function.

Yet still further, the "devices" or the "units" described in each of the above-described embodiments are not required to be in a single housing, and may be separated into a plurality of housings by function. In addition, the steps in the above-described flowcharts are not required to be processed in time series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An imaging apparatus capable of imaging using a self-timer, comprising:
   an imaging section;
   an imaging area setting section which selectively sets, based on a user operation, photographic subjects intended to be positioned on both ends of an imaging area from among a plurality of photographic subjects that may move; and
   an imaging control section which identifies positions after movement of the photographic subjects intended to be positioned on both ends of the imaging area which have been set by the imaging area setting section, and captures an image by controlling an image viewing angle of the imaging section so that the photographic subjects intended to be positioned on both ends of the imaging area are included within both ends of the imaging area, when imaging using the self-timer is performed.

2. The imaging apparatus according to claim 1, further comprising:
   an image processing section which acquires, after the imaging control section captures the image by controlling the
   image viewing angle of the imaging section so that the photographic subjects intended to be positioned on both ends of the imaging area are included in the imaging area, an image of the imaging area from the captured image such that the photographic subjects on upper and lower ends of the captured image are included.

3. The imaging apparatus according to claim 2, wherein the imaging section includes an optical zoom lens;
   wherein the imaging control section captures an actual image
   by the imaging section, by setting the optical zoom lens further to a wide-angle side than during setting of the imaging area by the imaging area setting section; and
   wherein the image processing section acquires an image of the imaging area from the actual image captured by the imaging
   section, such that the photographic subjects intended to be positioned on both ends of the imaging area which have been set by the imaging area setting section and the photographic subjects on the upper and lower ends of the actual image are included.

4. The imaging apparatus according to claim 3, wherein the imaging control section re-captures the actual image by setting the optical zoom lens further to the wide-angle side, when the photographic subjects intended to be positioned on both ends of the imaging area are not able to be identified from the captured actual image; and
   wherein the image processing section acquires an image of the imaging area from the actual image re-captured by the imaging section by the imaging control section setting the optical zoom
   lens further to the wide-angle side, such that the photographic subjects intended to be positioned on both ends of the imaging area which have been set by the imaging area setting section and the photographic subjects on upper and the lower ends of the re-captured actual image are included.

5. The imaging apparatus according to claim 3, wherein the imaging control section sets the optical zoom lens further to the wide-angle side than during setting of the imaging area by the imaging area setting section, until a set time of the self-timer elapses.

6. The imaging apparatus according to claim 1, wherein the imaging section includes an optical zoom lens; and wherein the imaging control section, when the imaging area including the photographic subjects intended to be positioned on both ends which have been set by the imaging area setting section is narrower than an imaging area of the image captured by controlling the image viewing angle of the imaging section, re-captures the image by setting the optical zoom lens to a telescopic side to such an extent that the photographic subjects intended to be positioned on both ends of the imaging area are included within the imaging area.

7. The imaging apparatus according to claim 1, further comprising:
   a display section which displays the image captured by the imaging section; and
   a touch panel provided on a surface of the display section;
   wherein the imaging area setting section sets the photographic subjects intended to be positioned on both ends of the imaging area based on the user operation performed on the touch panel provided on the surface of the display section.

8. The imaging apparatus according to claim 1, further comprising:
   a recognition section which recognizes the photographic subjects within the imaging area that is being captured by the imaging section;
   wherein the imaging area setting section selectively sets the photographic subjects intended to be positioned on both ends of the imaging area from among the photographic subjects recognized by the recognition section.

9. The imaging apparatus according to claim 1, further comprising:
   a confirmation section which confirms whether or not to store the image captured by the imaging section in accordance with control performed by the imaging control section.

10. A non-transitory computer-readable storage medium having stored thereon a program that is executable by a computer in an imaging apparatus having an imaging section and being capable of imaging using a self-timer, the program being executable by the computer to perform functions comprising:
   imaging area setting processing for selectively setting, based on a user operation, photographic subjects intended to be positioned on both ends of an imaging area from among a plurality of photographic subjects that may move; and
   an imaging control processing for identifying positions after moving the photographic subjects intended to be positioned on both ends of the imaging area which have been set by the imaging area setting processing, and capturing an image by controlling an image viewing angle for the imaging processing so that the photographic subjects intended to be positioned on both ends of the imaging area are included within both ends of the imaging area, when imaging using a self-timer is performed.

* * * * *